United States Patent [19]

Wilcox et al.

[11] Patent Number: 4,798,949

[45] Date of Patent: Jan. 17, 1989

[54] LINEAR ACTUATED OPTICAL CONCENTRATOR

[75] Inventors: William W. Wilcox, Simi Valley; Charles T. Kudija, Jr., Canyon Country, both of Calif.

[73] Assignee: Rockwell International Corporation, El Segundo, Calif.

[21] Appl. No.: 917,339

[22] Filed: Oct. 9, 1986

[51] Int. Cl.$^4$ ............................................. G01J 1/20
[52] U.S. Cl. ................................. 250/203 R; 250/234
[58] Field of Search ................ 250/203, 234; 343/765; 248/178

[56] References Cited

U.S. PATENT DOCUMENTS

| | | | |
|---|---|---|---|
| 3,215,391 | 11/1965 | Storm | 343/765 |
| 3,374,977 | 3/1968 | Moy, Jr. | 343/765 |
| 3,945,015 | 3/1976 | Gueguen | 343/765 |
| 4,086,485 | 4/1978 | Kaplow et al. | 250/203 |
| 4,192,289 | 3/1980 | Clark | 250/203 |
| 4,251,819 | 2/1981 | Vickland | 343/765 |
| 4,276,872 | 7/1981 | Blake et al. | 250/203 |
| 4,318,522 | 3/1982 | Appleberry | 248/178 |
| 4,519,382 | 5/1985 | Gerwin | 250/203 |
| 4,586,488 | 5/1986 | Noto | 250/203 |
| 4,656,349 | 4/1987 | Pinson et al. | 250/203 |

*Primary Examiner*—Edward P. Westin
*Assistant Examiner*—Charles W. Wieland
*Attorney, Agent, or Firm*—H. Fredrick Hamann; Harry B. Field; Lawrence N. Ginsberg

[57] ABSTRACT

An apparatus 10 for pointing an optical concentrator 20 in an extraterrestrial environment. A base 12 rigidly supports focal point equipment 16. At least three support means 18 are utilized for connecting the optical concentrator 20 to the base 12. The support means 18 include actuation means 28 for providing differential motion between the base 12 and the optical concentrator 20 and further include gimballing means 32,36 for accommodating the differential motion and independently gimballing the optical concentrator 20 with respect to the focal point equipment 16.

20 Claims, 4 Drawing Sheets

LINEAR ACTUATED OPTICAL CONCENTRATOR

BACKGROUND OF THE INVENTION

1. Field of the Invention

The present invention is directed to optical pointing mechanisms and, more specifically, to a pointing mechanism utilizing linear actuators to achieve independent gimballing of an optical concentrator and the focal point equipment in an extraterrestrial environment.

2. Prior Art

Prior state-of-the-art pointing mechanisms point, or move the entire optical package or system en masse. This means that the target or source is rigidly attached to the lens or reflector (optical concentrator). The pointing mechanism is attached to the reflector or lens, usually on the side or back of the reflector or lens. The pointing accuracy required by the target or source is obtained only through the use of this single mechanism.

This is adequate on earth under normal circumstances because the stiffness required in the support structure between the optical element and the target or source is inexpensive in terms of direct and indirect cost. The direct cost is the cost of the material and labor to fabricate the structure. The indirect cost is the cost of the effect of the structure on the rest of the system, such as power to point the system and the cost of the system support structure, foundation or transportation.

In space the indirect costs become extremely important and often drive the system costs. For Radio Frequency (RF) applications the source or target is a low-mass item. Consequently, the indirect cost penalty of the structure between the source/target and the optical element is not significant. Consequently, the cost of implementing prior art pointing mechanisms is not high for RF space applications.

However, for systems employing a heavy source or target, the indirect costs become prohibitive. For example, in the case of solar dynamic power systems, the primary impact of the indirect cost of employing prior art pointing mechanisms is in the moment of inertia impact on the space vehicle.

OBJECTS OF THE INVENTION

Accordingly, it is an object of this invention to provide an optical pointing apparatus for extraterrestrial applications.

Another object of the present invention is to provide a pointing apparatus which has a minimal impact on the moment of inertia of the space vehicle.

Yet another object of the invention is to provide a pointing apparatus which has minimal impact on the mass of the spacecraft.

Still another object of the invention is to provide a pointing apparatus which has a minimal impact on pointing power requirements.

Other objects, advantages and novel features of the present invention will become apparent from the following detailed description of the invention when considered in conjunction with the accompanying drawing.

SUMMARY OF THE INVENTION

The present invention provides an apparatus for pointing an optical concentrator in an extraterrestrial environment. In its broadest aspects, the apparatus comprises a base for rigidly supporting focal point equipment and at least three support means for connecting the optical concentrator to the base. The support means include actuation means for providing differential motion between the base and the optical concentrator and gimballing means for accommodating the differential motion. The apparatus therefore provides independent gimballing of the optical concentrator with respect to the focal point equipment.

In one embodiment, the support means includes three rigid elongate support elements, each connected at one end by a universal joint to the optical concentrator (either a reflector or a lens). Two of the support elements have linear actuators and are connected at their end to the base by a universal joint. The third support element is rigidly attached to the base.

In another embodiment a ring gimbal is utilized. One ring is connected to the optical concentrator and to a linear actuator which is, in turn, connected to the base. The other ring is supported by the base by two support members and connected to the base by a linear actuator.

The present invention is most useful in providing fine pointing adjustment over a limited angular range of, for example, 5° or less after coarse angular adjustments of, for example, ±5° or less have been made.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
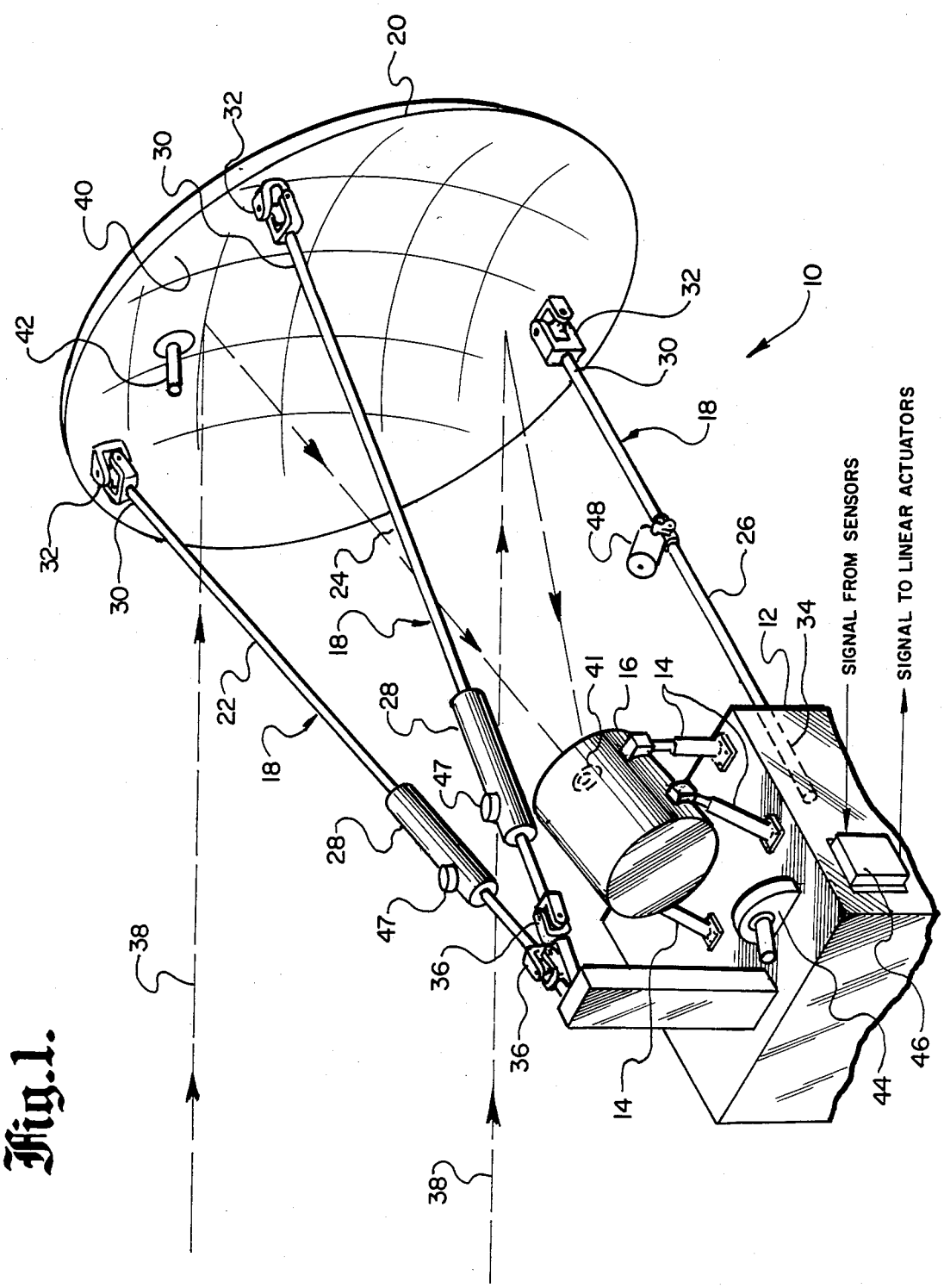
FIG. 1 is a schematic illustration of an embodiment of the invention using universal joints to attach a reflector to the base supporting the focal point equipment.

An embodiment of the present invention wherein the focal point equipment is utilized as a target for collecting is designated generally as 10 in FIG. 1. A base 12 is attached to, for example, the space station (not shown). The base 12 is aligned with the source of optical radiation by a coarse pointing mechanism to a sufficient accuracy to enable the apparatus to provide fine pointing. Support members 14 rigidly connect focal point equipment 16 to base 12. The focal point equipment 16 might be, for example, the solar receiver for the space station. Support means designated generally as 18 attach an optical concentrator, in this embodiment a reflector 20, to the base 12. Support means 18 include at least three struts or rigid elongate support elements 22,24,26. At least two support elements 22,24 have linear actuators 28 for controlling their lengths. Each support element 22,24,26 has a first end 30 connected to the optical concentrator 20 by gimballing means or joints 32. These joints 32 must be capable of accommodating the differential motion between the optical concentrator 20 and the support elements 22,24,26 and may, as shown, be universal joints. At least one of the support elements, i.e. element 26, has a second end 34 rigidly connected to the base 12. The other support elements 22,24 are connected to the base 12 by joints 36 which accommodate the differential motion between the support elements 22,24 and the base 12.

Light, as shown by arrows 38, is reflected off front surface 40 of optical concentrator 20 and directed to focal point equipment 16 as a concentrated image 41. Either closed or open loop control systems may be utilized. For example, in an open loop system, a sensor 42 located at the optical concentrator 20 ascertains misalignment between the optical concentrator 20 and the source of the light being concentrated. A sensor 44 located on the base ascertains misalignment between the base and the source of light. Control means 46, such as a microprocessor and software, compares the outputs of sensors 42,44 and commands the linear actuators 28 to move the optical concentrator 20 so that the resulting concentrated image 41 remains aligned with the focal point equipment 16.

In a second open loop system, a sensor 42 is located on optical concentrator 20 for ascertaining misalignment between the optical concentrator 20 and the source of the light being concentrated during operation. In addition, position sensors 47 are incorporated in actuation means 28 to determine relative position between concentrator 20 and base 12. Control means 46 processes the output from the sensor 42 and position sensors 47 and commands the linear actuators 28 to move and provide alignment between the concentrated image 41 and the focal point equipment 16.

In a closed loop system, a single sensor 48 is located on support element 26 for ascertaining misalignment between the concentrated image 41 and the center of focal point equipment 16. Control means 46 processes the output from sensor 48 and commands linear actuators 28 to move in order to provide alignment between the concentrated image 41 and the center of focal point equipment 16.

The invention provides a novel means of pointing an optical concentrator and locates massive target equipment close to the spacecraft attachment point. This results in the benefit of low space vehicle mass moment of inertia, thereby resulting in a supplemental benefit of low propellant consumption during attitude control maneuvers. Support means 18 of pointing apparatus 10 are much lighter than those commonly used resulting in minimal pointing apparatus mass. The low mass moment of inertia of the pointing apparatus 10, when compared to other pointing mechanisms results in minimized actuator force per unit optical concentrator movement, which in turn minimizes the optical concentrator pointing power requirements.

A further benefit can be realized if the aforementioned embodiment includes a linear actuator incorporated into support member 26. This adds the capability to focus optical concentrator 20 with respect to focal point equipment 16. The benefit of this embodiment is that the optical properties of the fine pointing apparatus 10 are improved and provide increased image quality at the focal point equipment.

Figure 2:
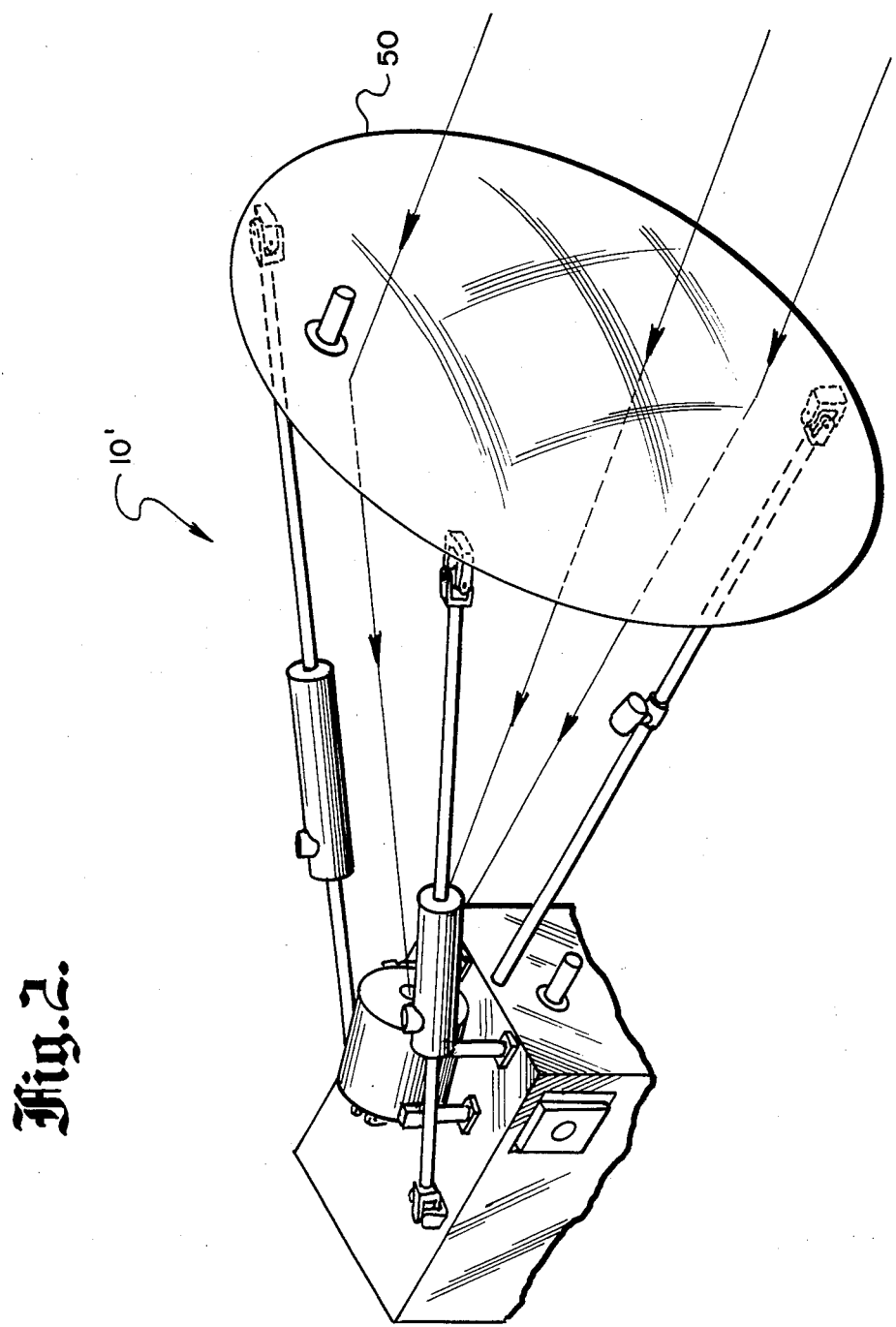
FIG. 2 is a schematic illustration of an embodiment of the invention using universal joints to attach a lens to the base supporting the focal point equipment.

A second embodiment of the present invention, designated generally as 10' in FIG. 2 illustrates the invention as applied to a lens. The elements of the invention shown in FIG. 2 are the same as in FIG. 1; however, the reflector 20 in FIG. 1 is substituted by a lens 50.

Figure 3:
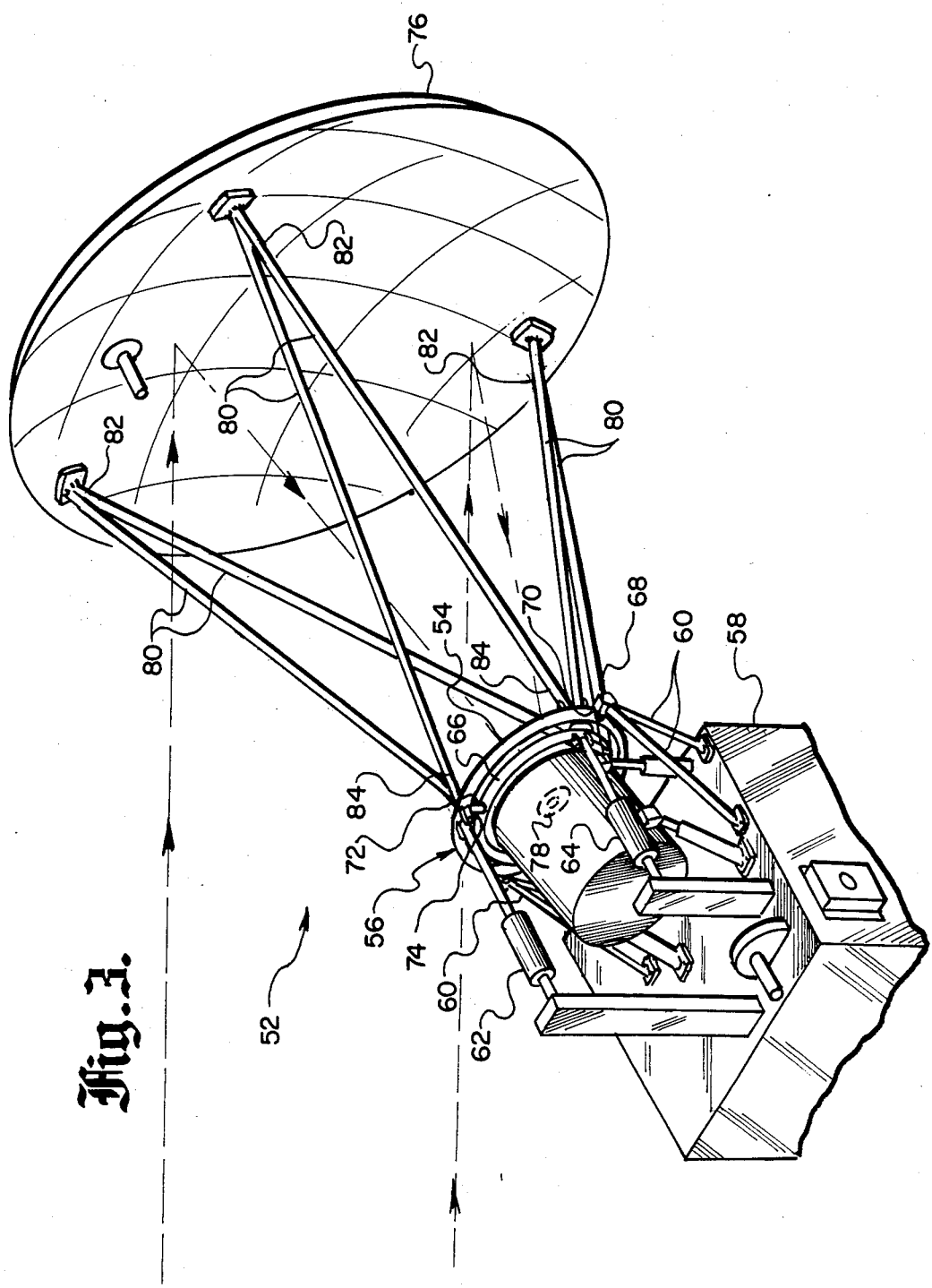
FIG. 3 is a schematic illustration of an embodiment of the invention using a ring gimbal to attach a reflector to the base supporting the focal point equipment.

A third embodiment of the invention is illustrated in FIG. 3 and is designated generally as 52. In this embodiment an outer ring 54 of a gimbal designated generaly as 56 is connected to a base 58 by support members 60. A linear actuator 62 also connects outer ring 54 to base 58. A second linear actuator 64 connects an inner ring 66 to base 58. Trunnions 68 are incorporated into the outer ring 54. Bearings 70 are incorporated into support members 60. The trunnions and bearings 68,70 form the connection between outer ring 54 and support members 60. Similarly, trunnions 72 and 74, respectively, interconnect outer ring 54 and inner ring 66. The intersection of the gimbal axes are substantially coincident with optical concentrator focal point 78. Elongate support elements or struts 80 are rigidly connected at one end 82 to optical concentrator or reflector 76. As in the other embodiments both closed and open loop control systems are available.

Figure 4:
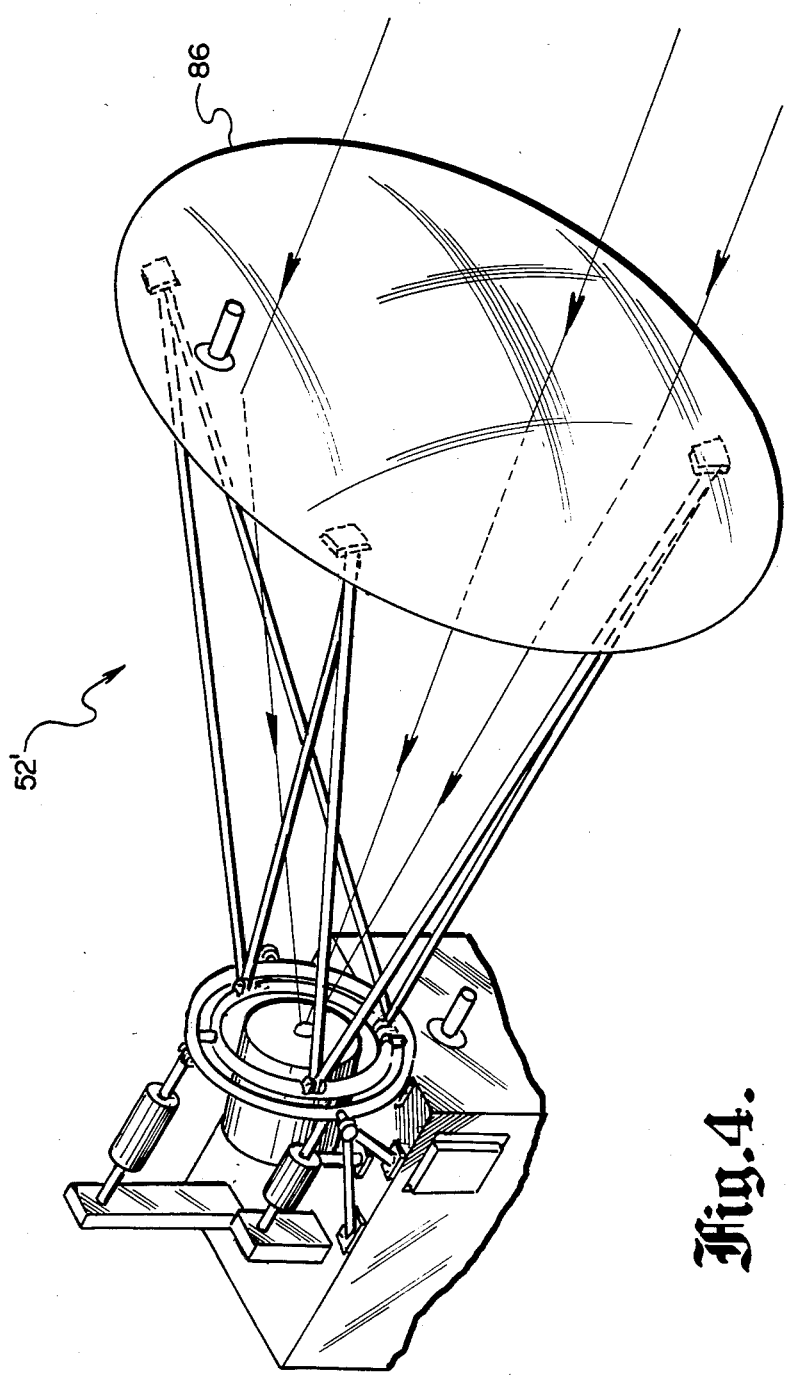
FIG. 4 is a schematic illustration of an embodiment of the invention using a ring gimbal to attach a lens to the base supporting the focal point equipment.

A fourth embodiment of the invention is illustrated in FIG. 4 and is designated generally as 52'. The elements of the invention shown in FIG. 4 are the same as in FIG. 3; however, the reflector 76 of FIG. 3 is replaced by a lens 86.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for pointing an optical concentrator in a desired orientation to focal point equipment, in an extraterrestrial environment, comprising:
   a base for rigidly supporting said focal point equipment; and
   at least three support means for connecting said optical concentrator to said base and including actuation means for providing differential motion between said base and said optical concentrator, said support means further including gimballing means for accommodating said differential motion and independently gimballing the optical concentrator with respect to the focal point equipment.

2. The apparatus of claim 1 wherein said optical concentrator is a reflector having a front surface which reflects the light being concentrated during operation of said apparatus, said support means extending from said front surface to said base.

3. The apparatus of claim 1 wherein said optical concentrator is a lens having a back surface facing said focal point equipment, said support means extending from said back surface to said base.

4. The apparatus of claim 1 further including an open loop control system comprising:
   sensor means located on said optical concentrator for ascertaining misalignment between the optical concentrator and the source of the light being concentrated during operation;
   sensor means located on said base for ascertaining the alignment between said base and said source of light; and
   control means for comparing the outputs of said sensor means and commanding said actuation means to move said optical concentrator so that the resulting concentrated image remains aligned with said focal point equipment.

5. The apparatus of claim 1 further including an open loop control system comprising:
   first sensor means located on said optical concentrator for ascertaining misalignment between said optical concentrator and the source of the light being concentrated during operation, said first sensor means having a first output; and second sensor means located on said actuation means for ascertaining the relative position between said optical concentrator and said base during operation, said second sensor means having a second output; and control means for processing said first and second outputs and commanding said actuation means to move and thereby provide alignment between the resulting concentrated image and said focal point equipment.

6. The apparatus of claim 1 wherein said support means includes:

at least three rigid elongate support elements, each support element having a first end connected to said optical concentrator by means of a joint which accommodates the differential motion between said optical concentrator and each said support element, at least two of said rigid support elements having linear actuators for controlling their length, at least one of said support elements having a second end rigidly connected to said base, the other of said support elements having second ends connected to said base by means of joints which accommodate the differential motion between said other support elements and said base.

7. The apparatus of claim 6 further including a closed loop control system comprising:

sensor means located on said at least one of said support elements which is rigidly attached to said base, said sensor means for ascertaining misalignment between the concentrated image of said optical concentrator and said focal point equipment during operation, said sensor means having an output; and control means for processing said output and commanding said actuation means to move and provide alignment between said concentrated image and said focal point equipment.

8. The apparatus of claim 1 wherein said support means includes:

a plurality of rigid elongate support elements, each support element having a first end rigidly attached to said optical concentrator and each support element having a second end;

a gimbal connected to said second ends of said support elements and to said base; and at least a first and a second linear actuator each having a first end connected to said gimbal and a second end connected to said base.

9. The apparatus of claim 8 wherein said gimbal includes:

a first ring rigidly attached to said second ends of said support elements and attached to a first end of said first linear actuator; and a second ring attached to a first end of another linear actuator and to said base, said first and second rings being interconnected by a pair of trunnion and bearings, said second ring connected to said base by another pair of trunnions and bearings.

10. The apparatus of claim 8 further including a closed loop control system comprising:

sensor means located on said optical concentrator for ascertaining misalignment between said optical concentrator and the source of light being concentrated during operation, said sensor means having an output; and control means for processing said output and commanding said actuation means to move and provide alignment between said source of light and said optical concentrator.

11. An apparatus for pointing an optical concentrator in a desired orientation to focal point equipment, in an extraterrestrial environment, comprising:

a base for rigidly supporting said focal point equipment; and at least three rigid elongate support elements, said support elements having first ends connected to said optical concentrator by means of joints which accommodate the differential motion between said optical concentrator and said support elements, at least two of said rigid support elements having linear actuators for controlling their lengths, at least one of said support elements having second ends rigidly connected to said base, the other of said elements having second ends connected to said base by means of joints which accommodate the differential motion between said support elements and said base, thereby independently gimballing the optical concentrator with respect to the focal point equipment.

12. The apparatus of claim 11 wherein said joints which accommodate differential motion are universal joints.

13. The apparatus of claim 11 wherein said optical concentrator is a reflector having a front surface which reflects the light being concentrated during operation of said apparatus, said support means extending from said front surface to said base.

14. The apparatus of claim 11 wherein said optical concentrator is a lens having a back surface facing said focal point equipment, said support means extending from said back surface to said base.

15. The apparatus of claim 11 further including an open loop control system comprising:

sensor means located on said optical concentrator for ascertaining misalignment between the optical concentrator and the source of the light being concentrated during operation;

sensor means located on said base for ascertaining misalignment between said base and said source of light; and control means for comparing the outputs of said sensor means and commanding said actuation means to move said optical concentrator so that the concentrated image remains aligned with said focal point equipment.

16. The apparatus of claim 11 further including an open loop control system comprising:

first sensor means located on said optical concentrator for ascertaining misalignment between said optical concentrator and the source of the light being concentrated during operation, the first sensor means having a first output;

second sensor means located on said actuation means for ascertaining the relative position between said optical concentrator and said base during operation, said second sensor means having a second output; and control means for processing said first and second outputs and commanding said actuation means to move and thereby provide alignment between the resulting concentrated image and said focal point equipment.

17. The apparatus of claim 11 further including a closed loop control system comprising:
- sensor means located on at least one of said support elements which is rigidly attached to said base, said sensor means for ascertaining misalignment between the concentrated image of said optical concentrator and said focal point equipment during operation, said sensor means having an output; and
- control means for processing said output and commanding said actuation means to move and provide alignment between said concentrated image and said focal point equipment.

18. An apparatus for pointing an optical concentrator in an extraterrestrial environment, comprising:
- a base for rigidly supporting focal point equipment; and
- a plurality of rigid support elements, each support element having a first end rigidly attached to said optical concentrator and each support element having a second end;
- a gimbal rigidly connected to said second ends of said support elements and to said base; and
- at least a first and a second linear actuator each having a first end connected to said gimbal and a second end connected to said base, whereby, the optical concentrator is independently gimballed with respect to said focal point equipment.

19. The apparatus of claim 18 wherein said gimbal includes:
- a first ring rigidly attached to said second ends of said support elements and to a first end of said first linear actuator; and
- a second ring attached to a first end of said second linear actuator and to said base, said first and second rings being interconnected by one pair of trunnions and bearings, said second ring connected to said base by another pair of trunnions and bearings.

20. The apparatus of claim 18 further including a closed loop control system comprising:
- sensor means located on said optical concentrator for ascertaining misalignment between said optical concentrator and the source of light being concentrated during operation, said sensor means having an ouput; and
- control means for processing said output and commanding said actuation means to move and provide alignment between said source of light and said optical concentrator.

* * * * *

UNITED STATES PATENT AND TRADEMARK OFFICE
CERTIFICATE OF CORRECTION

PATENT NO. : 4,798,949

DATED : Jan. 17, 1989

INVENTOR(S) : William W. Willcox and Charles T. Kudija, Jr.

It is certified that error appears in the above-identified patent and that said Letters Patent is hereby corrected as shown below:

Cover page:
Title: Take out "Wilcox et al." and put in --Willcox et al.--

Line 75: Take out "William W. Wilcox" and put in --William W. Willcox--

Signed and Sealed this

Eleventh Day of July, 1989

*Attest:*

DONALD J. QUIGG

*Attesting Officer*      *Commissioner of Patents and Trademarks*